(12) United States Patent
Zakharian (10) Patent No.: US 11,996,782 B2
(45) Date of Patent: May 28, 2024

(54) METHOD OF CONTROLLING POWER TRANSMISSION TO A LOAD

(71) Applicant: Manvel Zakharian, Laval (CA)

(72) Inventor: Manvel Zakharian, Laval (CA)

(73) Assignee: Manvel Zakharian, Laval (CA)

( * ) Notice: Subject to any disclaimer, the term of this patent is extended or adjusted under 35 U.S.C. 154(b) by 229 days.

(21) Appl. No.: 16/873,920

(22) Filed: Aug. 17, 2020

(65) Prior Publication Data
US 2022/0052615 A1 Feb. 17, 2022

(51) Int. Cl.
*H02M 5/04* (2006.01)
*H01H 33/59* (2006.01)
*H02M 5/06* (2006.01)
*H02M 5/08* (2006.01)
*H02M 5/22* (2006.01)
*H02M 5/275* (2006.01)
*H02M 5/293* (2006.01)

(52) U.S. Cl.
CPC ............ *H02M 5/08* (2013.01); *H01H 33/593* (2013.01)

(58) Field of Classification Search
CPC ............ H02M 5/08; H02M 5/04; H02M 5/06; H02M 5/22; H02M 5/275; H02M 5/293; H02M 5/2932; H01H 33/593
See application file for complete search history.

(56) References Cited

U.S. PATENT DOCUMENTS

| | | | | |
|---|---|---|---|---|
| 4,447,765 A * | 5/1984 | Cote | .................... | H02M 5/08 315/240 |
| 6,078,110 A * | 6/2000 | Zakharian | ............. | H02J 3/1835 307/109 |
| 6,320,281 B1 * | 11/2001 | Zakharian | ............... | H02M 3/07 307/108 |
| 6,608,405 B1 * | 8/2003 | Zakharian | ............... | H01G 7/00 307/108 |
| 2012/0112732 A1 * | 5/2012 | Mantock | ................. | H02M 5/08 323/364 |
| 2014/0300190 A1 * | 10/2014 | Weber | ..................... | H02J 1/00 307/31 |

* cited by examiner

*Primary Examiner* — Sisay G Tiku (57) ABSTRACT

The method of controlling power transmission to a load permits: to eliminate over-voltage in an electric circuit; to decrease energy losses and time of charging of an energy storing device; to increase service life of switches and provide very high reliability of power transmission to a load. The conception is following: controlling power transmission to a load from additional circuit so that current can be transferred from additional circuit to operating circuit (circuit with a load) and vice versa from operating circuit to additional circuit without interruption (without switching off) circuit of the load.

25 Claims, 9 Drawing Sheets

METHOD OF CONTROLLING POWER TRANSMISSION TO A LOAD

BACKGROUND OF THE INVENTION

The present invention relates to the methods of controlling of power transmission to a load.

Known cycle control changes the quantity of energy transmitted to a load by changing ratio off on number of whole cycles of voltage are applied to the load.

U.S. Pat. No. 6,188,208 is an example of mentioned cycle control with a zero-crossing detector for detecting when a cycle of the AC line power crosses zero voltage in order to detect the beginning of each AC line cycle.

The steps of connecting and disconnecting a load to the AC line power, when voltage crosses zero, can be useful if current of a load follows the input voltage. In other words, when impedance of a load is resistance (when reactance is practically equal to zero). Other disadvantages, which are presented in U.S. Pat. No. 6,188,208, are reproduced below (without additions):

"Disadvantageously, however, cycle-skipping control produces pulsating currents in the electrical mains that supply the power to the system. Such current pulses result in voltage fluctuations due to the power source impedance, which may have detrimental effects on other loads connected to the same electrical mains. In particular, if the other loads are used for lighting purposes, for example, visible flicker may result. Such flicker may cause a variety of physical problems for humans, such as headaches and disorientation, or even epileptic seizures in susceptible individuals. Additionally, flicker may cause problems in the controlled load if the controlled load radiates visible light, e.g., as in a radiant electric burner. Flicker problems in a visibly radiant load usually worsen as finer control resolution is required. Typical cycle-skipping control methods rely on skipping a certain percentage of cycles in a given control period. Hence, as power control resolution is increased, a greater number of cycles is needed in the control period. And as the control period approaches the visual time constant of the load, visible flicker ensues.

Phase control is an alternative type of control method that eliminates the flicker problem described hereinabove, but has the drawback that it inherently generates radio frequency interference and presents a reactive load to the AC line.".

A voltage transformer provides smooth regulation of power transmission to a load by changing voltage on the load. The voltage transformers have been applied in scientific and educational laboratories where relatively big weight and dimensions of a voltage transformer are admissible.

The consequences of the steps of switching on and switching off a load or the steps of switching on and switching off an electrical equipment (or a power supply) are additional energy losses and additional heating. For example, the consequence of the step of switching on a motor (or a transformer) is inrush current which is 5-8 times more (according to existing information) than nominal current. Inrush current decreases voltage level of source of energy (of AC line power).

Energy stored in an inductive component of an electric circuit is the cause of over-voltage when said circuit is interrupted. The consequence of switching off a circuit, having inductance (having inductive reactance, for example: circuit with coil, circuit with Induction heating coil or circuit with induction cooking coil), is over-voltage with spark discharge or arc discharge which damage contact of a switch, transfer material from one of two contacts to another contact (according to existing information) and can emit interference signals (according to existing information). At a moment of switching off, the value of over-voltage can be in one order of magnitude more than rated voltage. Therefore, the steps of switching on and switching off decrease the reliability and service live of an electrical equipment. For avoiding heat breakdown of same component of power electronic, it is necessary to use cooling devices, for example fans and heat sinks The process of charging of a battery is a process of transformation electrical energy into electrochemical energy. This process is reversible. There are different types of batteries (Lead-acid battery, Nickel-cadmium battery, Lithium-ion battery, etc). Voltage of a concrete unit for a car battery is limited by maximal cell voltage which can be from 1.0 to 3.7 volts (for different types of batteries). Therefore, series connection of cells for obtaining a battery for a car or electric car is inevitable.

Capacitors can be fabricated for any voltage but voltage of an unit of a super-capacitor can be from 2.5 to 2.7 volts (V). For obtaining an energy storing devices for a car or electric car, it is necessary to connect in series cells of super-capacitors. Capacitors and super-capacitors have been made with tolerance of capacities (approximately) ±5%. Therefore, connected in series super-capacitors cannot be charged to the same voltage. Voltage of a super-capacitor, which has minimal capacity (in comparison with any other super-capacitors connected in series), will be more than voltage of any other super-capacitor connected in series. For avoiding breakdown and achieving maximal service live, it is necessary to add additional components to connected in series capacitors (known solutions include smoothing circuits or smoothing resistors), but it cannot be realized without additional energy losses. Connected in series lithium-ion cells have the same problem. To solve this problem smoothing circuits or smoothing resistors also have been used for lithium-ion cells connected in series.

According to existing information: Maximal charging (a car battery) voltage should be restricted between 13.8 to 14.4 V. Otherwise the battery can be damaged; The maximum current of charging depends on the type of battery. For small batteries (including battery of a motorcycle), it is 3 amperes (A); The maximum current of charging of a Toyota Corolla battery is 5 A. The statement from "Owner's Manual" is: "The battery may explode if charged at a quicker rate"; There is a recommendation that the final voltage of charging should not exceed 13.8±0.15 V; Hybrid vehicles available today can only accept a maximum current from 16 A to 32 A.

The existing charger of a battery have used step-down transformers (for decreasing voltage of alternating current 120 V or 220 V) and control system for obtaining voltage (approximately) 14 V with current limitation. Some chargers include "switching regulator power supplies" in which the output voltage is determined by the on time of switching devices.

Most home sockets have following restrictions: max 125 V AC; max 15 A; Home European sockets of 220 V have different restrictions of maximum current: from 6 A to 16 A.

SUMMARY OF THE INVENTION

The causes of problems:

Duration of spark and arc discharges, between contacts of a switch (within switching off), in AC circuits is relatively less than duration of spark and arc discharges in DC circuits, between contacts of the same switch, because voltage of AC circuits is decreased to zero within half cycle. The same switch can be used in AC circuits and DC circuits, but operating voltage in DC circuits must be considerably less than operating voltage of AC circuits. For example, contacts of a relay designed for switching off 10 A in alternating circuits of 125 V can be used for switching off 10 A of DC when voltage of DC current is less than 30 V;

Continuous current limitation in any known circuit of direct current cannot be achieved without energy losses and heating of an electronic component (realizing current limitation), if conception, described in U.S. Pat. No. 6,608,405 of the applicant (FIG. 39, FIG. 38a and FIG. 38b), is not applied;

Current limitation is also necessary within charging of a super-capacitor;

Heating decrease reliability and life of a power electronic circuit;

Duration of 100% charge of a battery cannot be considerably decreased because the maximal voltage of charging is restricted. Current of charging, in the end of charging, is several time and more less than starting current of charging, because difference between charging and battery voltages is small. For example, "Classic Series Battery Charger" of 2 A provides charging with current 2 A, when level of charging of the battery less than 80%, then current of charging decreases to level less than 0.6 A when level of charging of the battery approximately equally to 90%. The statement from instruction is: "A spark near a battery may cause a battery explosion". A spark also can damage or put the charger out of action;

U.S. Pat. No. 6,608,405 of the applicant includes technical solution for alternating voltage (FIG. 39) with a DC load (L), in which a voltage source 35 of alternating current (FIG. 38a) is connected to said DC load (L) through an adjustable capacitor and a bridge rectifier. This technical solution controls power transmission to said load (from said voltage source of alternating current 35) by changing the value of capacitance of the adjustable capacitor. Said adjustable capacitor (connected in series to said load) can prevent over-voltage (which is applied to said load), if AC line power crosses zero voltage, in the moment to of switching on of said source 35 (FIG. 38a). FIG. 38b demonstrates functioning of the adjustable capacitor when the AC line power crosses zero voltage, in the moment to of switching on of said source 35. But an adjustable capacitor cannot prevent breakdown of an energy storing device, if value of voltage of AC line power (for example), in the moment ($t_2$ or $t_6$, FIG. 38a) of switching on of said source 35, is equal to amplitude.

The causes (described above) of problems (an over-voltage; decreasing reliability and reduction of service life of switches; energy losses in electric circuits; increasing time of charging of an energy storing device) are eliminated by the author's conception which had been realized by concrete technical solutions.

The conception (for eliminating all mentioned above problems) is following: controlling power transmission to a load from additional circuit (without interruption current of chosen capacitor(s) and without interruption voltage of chosen alternating current source) so that current can be transferred from additional circuit to operating circuit (circuit with a load) and vice versa from operating circuit to additional circuit without interruption (without switching off) circuit of the load. Decreasing the time of charging an energy storing devices by choosing a voltage source of alternating current which amplitude exceeds approximately no less than one order of magnitude the rated voltage of said energy storing device. For example, voltage source can be source of alternating current of 120 V, 60 Hz, or source of alternating current of 240 V (60 Hz), or source of alternating current of 220 V (50 Hz), or source of alternating current of 380 V (50 Hz). Technical solutions realizing said conception permit interrupting current of a load without interrupting circuit of power transmission to the load.

The using of conception will improve power Power Factor, because the current is capacitive current.

This conception can control power transmission to a load with a rated voltage, by choosing capacitor(s) [with appropriate capacitance(s)] permitting to obtain desirable rated current of said load (when current is equal to rated current $I_{RAT}$, the voltage is equal to rated voltage $U_{RA}$ of the load).

Figure 34:
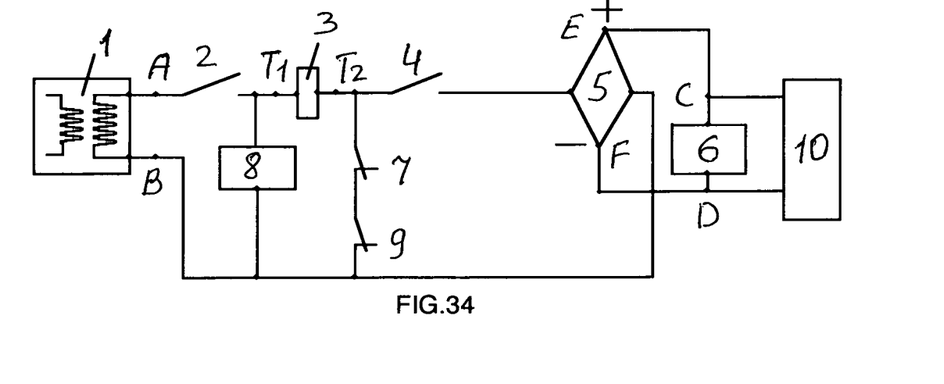

The present method provides very small difference between starting current of charging and current of charging (of an energy storing device) in the end of charging. Theoretically (for a car or hybrid car battery): For the rate of charging 10 A and AC source 120 V (60 Hz), current of charging, in the end of charging, approximately equal to 9.18 A; For the rate of charging 10 A and AC source 220 V (50 Hz), current of charging, in the end of charging, approximately equal to 9.5 A; For the rate of charging 10 A and AC source 240 V (60 Hz), current of charging, in the end of charging, approximately equal to 9.65 A; For the rate of charging 2 A and AC source 120 V, current of charging, in the end of charging, approximately equal to 1.84 A; For the rate of charging 2 A and AC source 220 V, current of charging, in the end of charging, approximately equal to 1.91 A. These data permit to state that present method can considerably decrease the time of charging of an energy storing device, including a battery of a phone. If will be necessary, the difference (between starting current of charging and current in the end of charging) can be more decreased by using AC source with step-up transformer (FIG. 34).

The present method also provides power transmission to a load of AC 120 V from European socket of 220 V, without using a transformer and all electrical devices, which has been made for AC 120 V, can be used in Europe (without using a transformer).

The steps of claims 1 and 2 permit to realize the described conception for a AC load and a DC load accordingly.

BRIEF DESCRIPTION OF THE DRAWINGS

FIG. 2 and FIG. 3 with FIG. 4 illustrate the realizations of the described conception for an inductive load L (for example, a load can be a coil, or a relay, or a contactor, or a heating coil, or a heating coil interacting with a magnet material, or a heating coil of an oven).

FIG. 2, FIG. 5, FIG. 8, FIG. 10, FIG. 11, FIG. 33, FIG. 35 and FIG. 36 illustrate the realizations in which a capacitor device 3 connected in parallel with said voltage source 1 through said first $T_1$ and second $T_2$ output terminals of said capacitor device 3 and an additional switching device 7 in on state.

FIG. 3, FIG. 12, FIG. 13, FIG. 14, FIG. 17, FIG. 20, FIG. 34 and FIG. 37 illustrate the realizations in which a capacitor device 3 connected in parallel with said voltage source 1 through said first $T_1$ and second $T_2$ output terminals of said capacitor device 3 and a first 7 and a second 9 additional switching devices in on state;

FIG. 7 illustrates that is not important how capacitors C are connected inside of a capacitor device 3 because the value of power transmission to a load depends on total capacitance (sheet 13 of U.S. Pat. No. 6,608,405 of the applicant demonstrates this). Therefor, each of said capacitors C (FIG. 7) can have different value of capacitance. Capacitor devices 3 can be formed with fuses $F_1, F_2, F_3 \ldots F_N$. (FIG. 19).

FIG. 2, FIG. 5, FIG. 10, FIG. 12, FIG. 14 and FIG. 33 illustrate the realizations with a capacitor 3 or the realizations in which only one capacitor $C_1$ of a capacitor device 3 is connected to first $T_1$ and second $T_2$ output terminals (FIG. 6).

FIG. 3, FIG. 8, FIG. 11, FIG. 13, FIG. 17, FIG. 20, FIG. 34, FIG. 35, FIG. 36 and FIG. 37 with FIG. 18 and FIG. 19 illustrate the realizations in which more than one of capacitors $C_1, C_2, C_3 \ldots C_N$ (or more than one of capacitors C, FIG. 7) of said capacitor device 3 is connected to first $T_1$ and second $T_2$ output terminals of said capacitor device 3 (FIG. 18 and FIG. 19 demonstrate this).

FIG. 2, FIG. 3, FIG. 5, FIG. 8, FIG. 12, FIG. 13, FIG. 14, FIG. 17, FIG. 20, FIG. 33, FIG. 34, FIG. 35, FIG. 36 and FIG. 37 illustrate the realizations with a device 8 for controlling the steps of switching on and switching off said additional switching device 7 and said operating switching device 4. As a controlling device 8 can be used also a time rely. For example, a normally closed contact 7 and a normally open contact 4 of a time relay can be used as said additional and operating switching devices 7 and 4 accordingly (FIG. 9).

FIG. 14, FIG. 17, FIG. 33 and FIG. 34 illustrate the realizations with the steps of measuring at least a parameter of said load 6, by control system 10 and using it for triggering switching on and switching off said additional switching device 7 or for triggering switching on and switching off said second additional switching device 9.

FIG. 14, FIG. 17, FIG. 20 and FIG. 33 illustrate the realizations with a second operating switching device 11 in on state, which can be switched off and switched on by said control system 10. The normally closed contact 11 of a relay or a time relay (FIG. 15) can be used as second operating switching device 11.

FIG. 20 illustrates a realization in which said load is formed by three loads 6, 6 and 6.

FIG. 33 illustrates a realization of controlling power transmission to a load (with second operating switching device 11) in which said voltage source 1 includes a voltage transformer.

FIG. 34 illustrates a realization of controlling power transmission to a load in which said voltage source 1 includes a step-up transformer.

FIG. 35, FIG. 36 and FIG. 37 illustrate the realizations of controlling power transmission to a load in which said additional switching device 7 (FIG. 35 and FIG. 36) or second additional switching devices 9 (FIG. 37) is controlled by zero crossing (voltage) control device 13 connected to said voltage source 1 through a bridge rectifier 14. In FIG. 35, a load 6 is a load of AC. In FIG. 36 and FIG. 37 a load 6 is a load of DC.

DETAILED DESCRIPTION OF THE INVENTION

The method of controlling power transmission to a load is demonstrated below, and it can provide any desirable current for at least a load. For example: current from 0.01 A to 100 A by the steps of choosing capacitors with appropriate capacitances and forming a capacitor device with said capacitors. Appropriate capacitances provide appropriate desirable current $I_{DES}$ which can be: rated current $I_{RAT}$ ($I_{DES}=I_{RAT}$); Maximum current $I_{MAX}$ ($I_{DES}=I_{MAX}$); Minimal current $I_{MIN}$ ($I_{DES}=I_{MIN}$), etc.

Appropriate capacitances can be determined from equations (presented below) in accordance with chosen voltage source 1.

Figure 1:
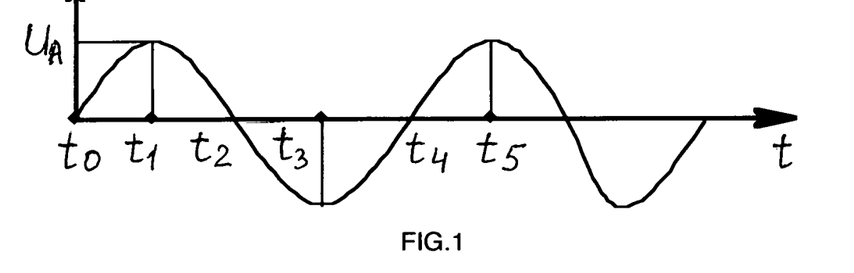
FIG. 1 illustrates voltage of AC source.

If chosen voltage source of AC is voltage source of 120 V (60 Hz), then its amplitude $U_A$ (FIG. 1) is desirable amplitude $U_{DES}$ with value:

$U_A=U_{DES}=\sqrt{2}\times 120$ V. As a load 6 (for example) can be DC load from 1 V to 24 V and more (FIG. 5, FIG. 8, FIG. 10, FIG. 11, FIG. 12, FIG. 13, FIG. 14, FIG. 17, FIG. 20, FIG. 33, FIG. 34, FIG. 36 and FIG. 37). Appropriate capacitance $C_{RAT}$ (for a DC load 6) can be determined from the equation 1 below.

As a load 6 can be also control circuits of a switching device, or a relay, or a contactor (FIG. 2, FIG. 3, FIG. 5, FIG. 8, FIG. 10, FIG. 11, FIG. 12, FIG. 13, FIG. 35, FIG. 36 and FIG. 37).

A capacitor device 3 (FIG. 8, FIG. 11, FIG. 13, FIG. 17, FIG. 20, FIG. 34, FIG. 36, FIG. 37 with FIG. 6), including 3 capacitors with capacities $C_{RAT}$, $C_{MAX}$ and $C_{MIN}$, can provide currents $I_{RAT}$, $I_{MAX}$ and $I_{MIN}$ by switching on and switching off appropriate switching devices $S_1$, $S_2$ and $S_3$. Capacities $C_{RAT}$, $C_{MAX}$ and $C_{MIN}$ can be determined from equations 1, 2 and 3.

$$I_{RAT}=C_{RAT}\times(\sqrt{2}\times 120-U_{RAT})\times 240 \tag{1}$$

$$I_{MAX}=C_{MAX}\times(\sqrt{2}\times 120-U_{MAX})\times 240 \tag{2}$$

$$I_{MIN}=C_{MIN}\times(\sqrt{2}\times 120-U_{MIN})\times 240 \tag{3}$$

The values of $I_{RAT}$ and $U_{RAT}$ (rated voltage) are known for a load which has been made and can be found from description of said load.

In case of a short circuit between terminals (C and D) of said load, current $I_{SHC}$ will be limited, and its value $I_{SHC}$ will be:

$$I_{SHC}=C_{MAX}\times\sqrt{2}\times 120\times 240 \tag{4}$$

A capacitor device 3 (FIG. 3, FIG. 35 with FIG. 6), including 3 capacitors with capacities $C_{RAT}$, $C_{MAX}$ and $C_{MIN}$, can provide currents $I_{RAT}$, $I_{MAX}$ and $I_{MIN}$ by switching on and switching off appropriate switching devices $S_1$, $S_2$ and $S_3$. Capacities $C_{RAT}$, $C_{MAX}$ and $C_{MIN}$ can be determined from equations 5, 6 and 7.

$$I_{RAT}=C_{RAT}\times\sqrt{2}\times(120-U_{RAT})\times 240 \tag{5}$$

$$I_{MAX}=C_{MAX}\times\sqrt{2}\times(120-U_{MAX})\times 240 \tag{6}$$

$$I_{MIN}=C_{MIN}\times\sqrt{2}\times(120-U_{MIN})\times 240 \tag{7}$$

Current $I_{SHC}$ (the equations 4) is usual current because it cannot evoke harmful effects on the technical solutions described above and below.

Voltage source 1 with a voltage transformer (FIG. 33) can smoothly change current from $I_{MAX}$ to $I_{MIN}$ by changing output voltage, when capacity of said capacitor device (FIG. 6) is equal to $C_{MAX}$.

If chosen voltage source of AC is voltage source of 220 V (50 Hz), then its amplitude $U_A$ (FIG. 1) is desirable amplitude $U_{DES}$ with value:

$U_A=U_{DES}=\sqrt{2}\times 220$ V. Appropriate capacitance $C_{RAT}$ can be determined from equation:

$$I_{RAT}=C_{RAT}\times(\sqrt{2}\times 220-U_{RAT})\times 200 \tag{8}$$

Figure 2:
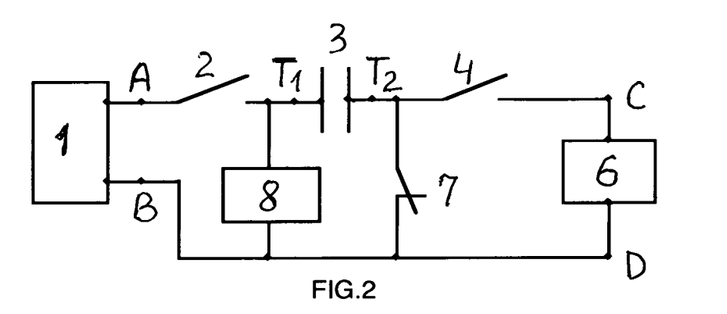
FIG. 2, FIG. 3 and FIG. 35 illustrate the realizations of the described conception for a AC load 6 with terminals C and D. Terminals A and B are terminals of a voltage source. Terminals $T_1$ and $T_2$ are first and second terminals of a capacitor device 3 or terminals of a capacitor. Terminal $T_2$ of said capacitor device is connected in series with said load 6 through an operating switching device 4 in off state. Terminals $T_1$ is connected to terminal A of a voltage source 1 of AC with a switching device 2.
Figure 3:
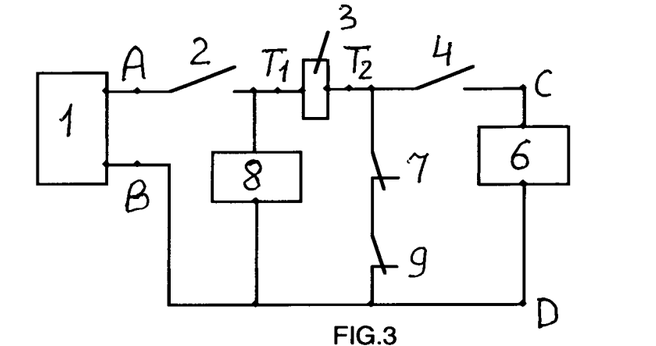
Figure 4:
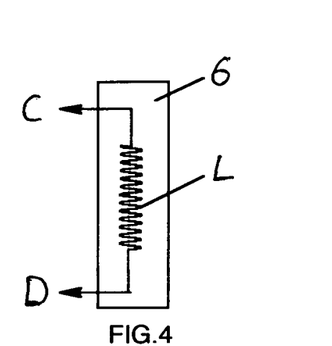
Figure 5:
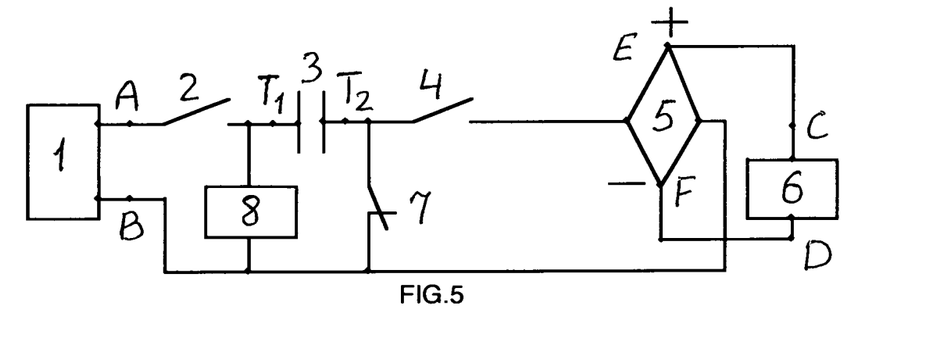
FIG. 5, FIG. 8, FIG. 12, FIG. 13, FIG. 14, FIG. 17, FIG. 20, FIG. 33, FIG. 34, FIG. 36 and FIG. 37 illustrate the realizations of the described conception for a DC load 6 with terminals C and D. Terminals A and B are terminals of a voltage source with a switching device 2. Terminals $T_1$ and $T_2$ are first and second terminals of a capacitor device 3 or terminals of a capacitor. Terminal $T_2$ of said capacitor device 3 is connected in series with said load 6 through an operating switching device 4 in off state and a bridge rectifier 5.
Figure 35:
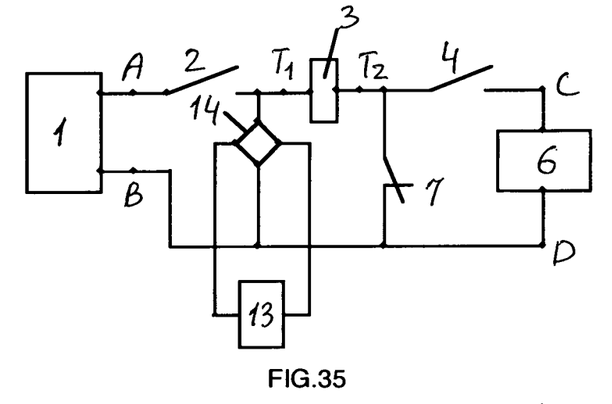
Figure 36:
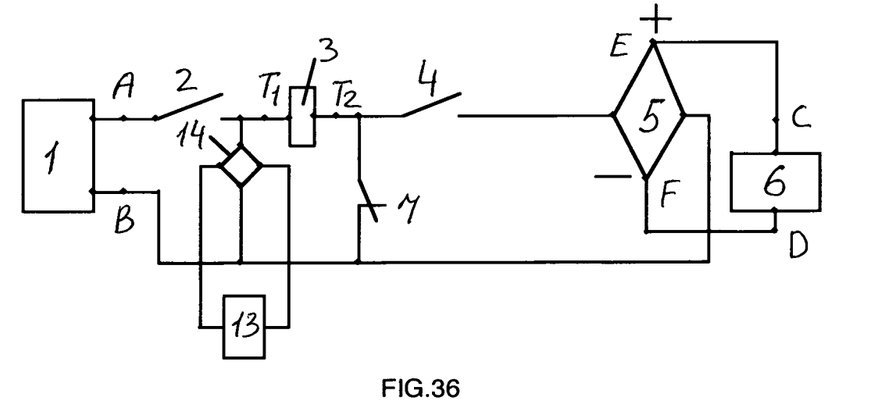
Figure 37:
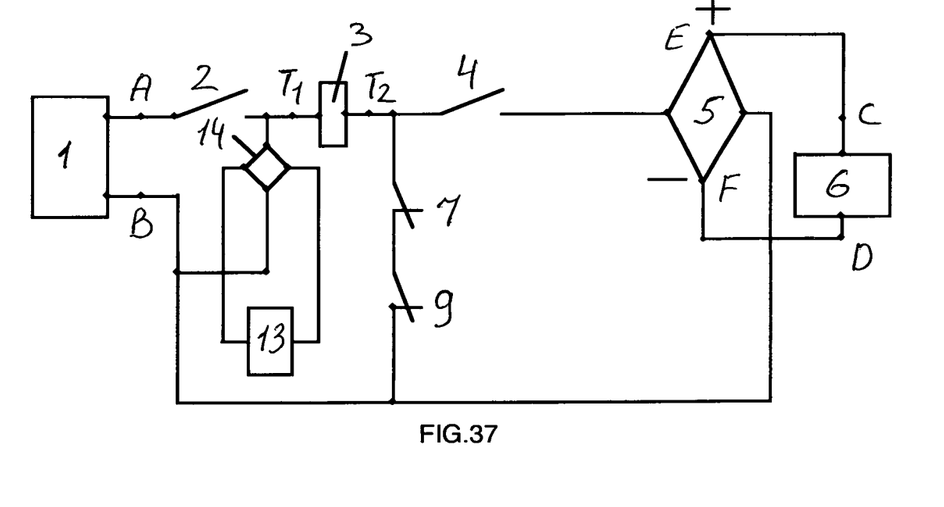

The present method permits to use an electric device of AC 120 V in Europe without step-down transformer by choosing appropriate capacitance $C_{RAT}$ from equation 9 below (FIG. 2, FIG. 3 and FIG. 35).

A capacitor device 3 (FIG. 3, FIG. 35 with FIG. 6), including 3 capacitors with capacities $C_{RAT}$, $C_{MAX}$ and $C_{MIN}$, can provide currents $I_{RAT}$, $I_{MAX}$ and $I_{MIN}$ (from a European socket) for an electric device of AC 120, by switching on and switching off appropriate switching devices $S_1$, $S_2$ and $S_3$. Capacities $C_{RAT}$, $C_{MAX}$ and $C_{MIN}$ can be determined from equations 9, 10 and 11.

$$I_{RAT}=C_{RAT}\times\sqrt{2}\times(220-120)\times 200 \tag{9}$$

$$I_{MAX}=C_{MAX}\times\sqrt{2}\times(220-U_{MAX})\times 200 \tag{10}$$

$$I_{MIN}=C_{MIN}\times\sqrt{2}\times(220-U_{MIN})\times 200 \tag{11}$$

In case of a short circuit, between terminals (C and D) of said load 6 (connected to a European socket), current $I_{SHC}$ will be limited. Its value $I_{SHC}$ will be:

$$I_{SHC}=C_{MAX}\times\sqrt{2}\times 220\times 200 \tag{12}$$

Current $I_{SHC}$ is also usual current because it cannot evoke harmful effects on a technical solutions described above and below.

Voltage source 1 with a step-up transformer (FIG. 2, FIG. 3, FIG. 35 with FIG. 34) permits obtaining any desirable amplitude $U_{DES}$ with value more than $\sqrt{2}\times 120$ V or with value more than $\sqrt{2}\times 220$. Appropriate capacitance $C_{RAT}$, for 60 Hz or 50 Hz, can be determined from equation 13 or 14 accordingly.

$$I_{RAT}=C_{RAT}\times\sqrt{2}\times(U_{DES}-U_{RAT})\times 240 \tag{13}$$

$$I_{RAT}=C_{RAT}\times\sqrt{2}\times(U_{DES}-U_{RAT})\times 200 \tag{14}$$

Appropriate capacitance $C_{RAT}$, for other frequencies F, can be determined from equation:

$$I_{RAT}=C_{RAT}\times\sqrt{2}\times(U_{DES}-U_{RAT})\times 4\times F \tag{15}$$

The value of power transmission to a load depends on the total capacity of said capacitor device 3. Therefore, the descriptions of the technical solutions with a capacitor 3 (presented below: FIG. 2, FIG. 5, FIG. 10, FIG. 12, FIG. 14 and FIG. 33) are also the descriptions of the technical solutions with a capacitor device 3 (FIG. 3, FIG. 8, FIG. 11, FIG. 13, FIG. 17, FIG. 20, FIG. 34, FIG. 35, FIG. 36 and FIG. 37).

For controlling power transmission to a load it is necessary to choose a voltage source of alternating current 1 with an amplitude which is more than rated voltage of a load. For an induction heating load 6 (FIG. 2, FIG. 3 and FIG. 35), the chosen voltage source can be high frequency (for example, with a frequency F from range 10 kHz to 90 kHz) voltage source 1. The more the frequency F, the less value $C_{RAT}$ of capacity of a capacitor 3 providing current $I_{RAT}$ (the equation 15).

Many electrical devices include step-down transformers for obtaining, for example, 24 V, or 12 V, or 9 V, or 5 V. For these cases the present method can realize two purposes: decreasing voltage and controlling power transmission to a load of 24 V, or 12 V, or 9 V, or 5 V. There are two different sockets in Canada: one for AC, 125 V and another for AC, 240 V. This method can control power transmission to a load of AC, 120 V by using as a voltage source, for example, a voltage source of AC, 240 V, or a voltage source of AC, 400 V, or a voltage source of AC, 600 V etc.

The more the difference $U_{DES}-U_{RAT}$, the less value $C_{RAT}$ of capacity of a capacitor 3 providing current $I_{RAT}$ (the equations 13 and 14).

After choosing a voltage source of alternating current (with desirable amplitude) and determining $C_{RAT}$ of capacity of a capacitor 3 from (presented above) appropriate equation (on the base $I_{RAT}$ and $U_{RAT}$ of a concrete load), the technical solutions (FIG. 2, FIG. 3 and FIG. 35) and their functioning are realized by the steps:

connecting second output terminal $T_2$ of capacitor 3 (with capacity $C_{RAT}$) in series with said concrete load 6 through at least an operating switching device 4 in off state;

connecting said series connected circuit to said voltage source 1 through first output terminal $T_1$ of said capacitor 3;

connecting said capacitor 3 in parallel with said voltage source 1 through said first $T_1$ and second $T_2$ output terminals and at least an additional switching device 7 in on state (FIG. 2 and FIG. 35) or connecting said capacitor 3 in parallel with said voltage source 1 through said first $T_1$ and second $T_2$ output terminals and a first 7 and a second 9 additional switching devices in on state (FIG. 3);

switching on said voltage source (by switching device 2), then, after a delay time, switching on said operating switching device 4, then switching off said additional switching device 7;

controlling power transmission to said load by switching on and switching off said additional switching device 7 or controlling power transmission to said load 6 by switching on and switching off said second additional switching device 9.

Figure 9:
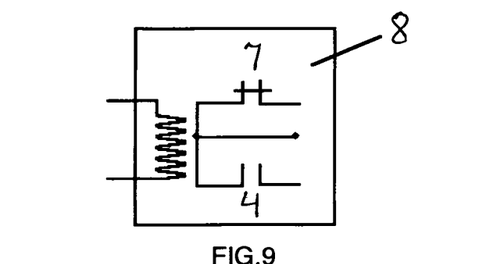
Figure 10:
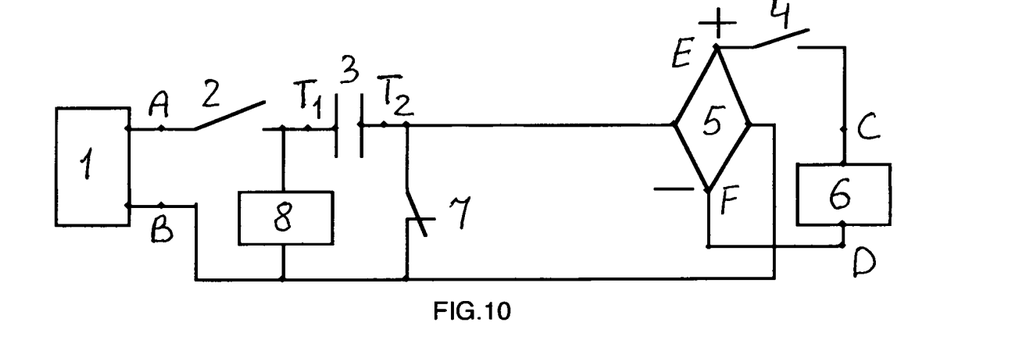
FIG. 10 and FIG. 11 illustrate the realizations in which terminal $T_2$ of said capacitor device is connected in series with a DC load 6 through a bridge rectifier 5 and at least an operating switching device 4 in off state. Terminal $T_1$ of said capacitor device 3 is connected to terminal A of an AC voltage source 1 with a switching device 2.
Figure 11:
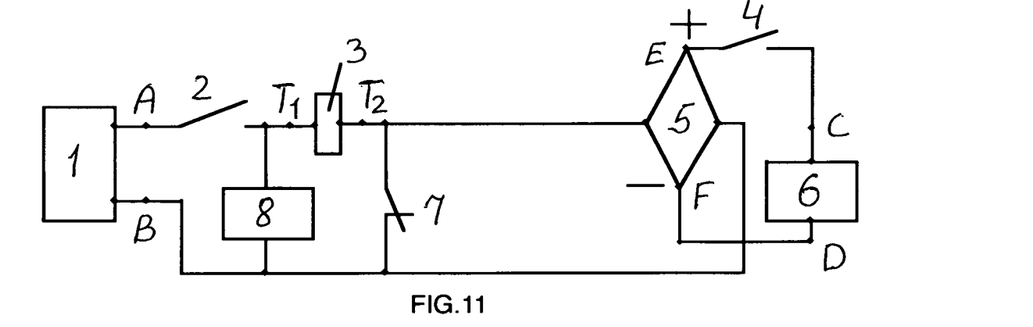
Figure 12:
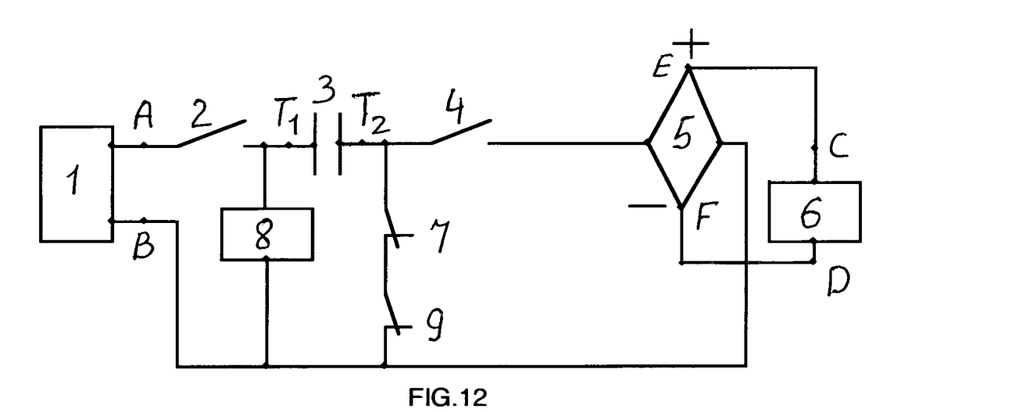
Figure 13:
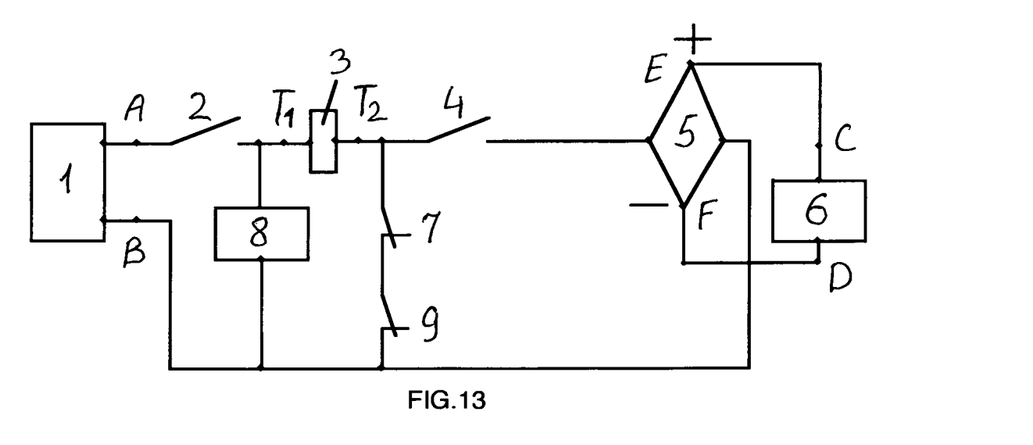
Figure 14:
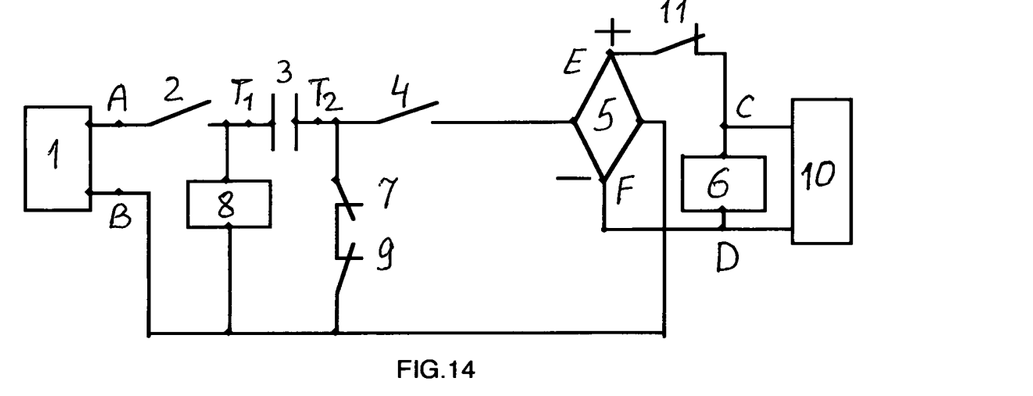

The present method excludes an over-voltage on the load 6, when switching device 2 (of said voltage source 1) turn on in the moment $t_1$ (FIG. 1), because operating switching device 4 is off. The time relay 8 turn on (from a moment of switching on switching device 2) and its contacts 7 (said additional switching device 7) is on, contacts 4 (said operating switching device 4) is off (FIG. 9). From said moment $t_1$ capacitor 3 is connected in parallel with voltage source 1. Within each period of oscillation (cycle) capacitor 3 is charged two time and two time is discharged. The difference between voltage $U_{SOUR}$ of source 1 and voltage $U_{CAP}$ on the terminals $T_1$ and $T_2$ of capacitor 3 is very low, because impedance of connecting wires and impedances of switching devices 6 and 9 (when they are switched on) is very low:

$$U_{SOUR} - U_{CAP} \approx 0 \quad (16)$$

After a delay time $\Delta t$, operating switching device 4 is switched on. After this, current of a load $I_{LOAD}$ will be very low (because $U_{SOUR} - U_{CAP} \approx 0$):

$$I_{LOAD} \approx 0 \quad (17)$$

After switching off additional switching device 7, current of the load 6 ($I_{LOAD}$) will be equal to $I_{RAT}$, because the value of capacity of capacitor 3 is equal to $C_{RAT}$ (determined from equation 1, or 5, or 8, or 9, or 13, or 14, or 15 in accordance with chosen voltage source of AC).

The value of power transmission to a load 6 can be controlled by switching on and switching off said additional switching device 7 (FIG. 2, FIG. 5, FIG. 8, FIG. 10, FIG. 11, FIG. 33, FIG. 35 and FIG. 36), or by switching on and switching off said second additional switching device 9 (FIG. 3, FIG. 12, FIG. 13, FIG. 14, FIG. 17, FIG. 20, FIG. 34 and FIG. 37) and varying the ratio of on-to-off time of said additional switching device 7, or varying the ratio of on-to-off time of said second additional switching device 9. Rated power of said second additional switching device 9 can be considerably less than rated power of a switching device which is made for a concrete load 6, because: said capacitor 3 suppresses level of inrush current within the steps of switching on; in any moment of switching off, the difference between voltage $U_{SOUR}$ of source 1 and voltage $U_{CAP}$ (on the terminals $T_1$ and $T_2$ of capacitor 3) is very low:

$$U_{SOUR} - U_{CAP} \approx 0.$$

Rated power of second additional switching device 9 can be decreased more in a technical solution (FIG. 37) where the steps of switching on of second additional switching devices 9 is controlled by zero crossing (voltage) control device 13 connected to said voltage source 1 through a bridge rectifier 14. Rated power of said additional switching device 7 can be decreased more in the technical solutions (FIG. 35 and FIG. 36) where the steps of switching on of said additional switching devices 7 is controlled by zero crossing (voltage) control device 13 connected to said voltage source 1 through a bridge rectifier 14. Known zero crossing (voltage) control are used opto-coupler for triggering control circuit of a TRIAC. For switching on said additional switching device 7 (FIG. 35 and FIG. 36) or said second additional switching device 9 (FIG. 37) can be used control system which is similar to control systems, described in U.S. Pat. No. 6,320,281 of the applicant, for example, presented in FIG. 9, FIG. 10, FIG. 11 and FIG. 20 of said patent. As an additional switching device 7 or an second additional switching device 9 can be also used a TRIAC.

Transfer of current, (by the step of switching off of one of said additional switching devices 7 or 9) from additional circuit (circuit with said additional switching device 7 or circuit with said first 7 and second 9 additional switching devices) to operating circuit (circuit with a load 6) and vice versa from operating circuit to additional circuit (by the step of switching on of one of said additional switching devices 7 or 9) without interruption circuit of a load 6 (FIG. 2, FIG. 3, FIG. 5, FIG. 8, FIG. 10, FIG. 11, FIG. 12, FIG. 13, FIG. 14, FIG. 17, FIG. 20, FIG. 33, FIG. 34, FIG. 35, FIG. 36 and FIG. 37), permits to eliminate all mentioned above problems.

The step of switching on said additional switching device 7 or said second additional switching device 9 before switching off said operating switching device 4 permits: to eliminate over-voltage; to decrease considerably power of operating switching device 4 which is necessary to use for a concrete load 6.

FIG. 14, FIG. 17, FIG. 20 and FIG. 33 illustrate the technical solutions with second operating switching device 11.

Figure 15:
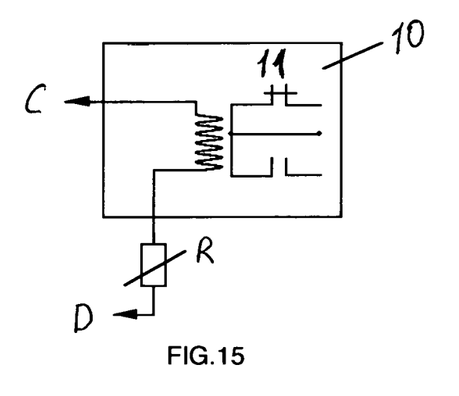

FIG. 14, FIG. 17, FIG. 33 and FIG. 34 illustrate the technical solutions with a control system 10 for triggering switching on and switching off said additional switching devices 7 or said second additional switching devices 9 in accordance with a measured parameter. The control system 10 includes at least a sensor for measuring a parameter of said load 6 or a parameter near to said load 6. Control system 10 uses a measured parameter for triggering switching on and switching off said additional switching devices 7 or said second additional switching devices 9. For example: control system 10 can measure temperature of a load 6 or temperature near to a load 6, when said load is a heater; control system 10 can measure voltage or voltage and temperature, when said load is an energy storing device. A relay (FIG. 15) can be used when said load 6 is an energy storing device. Normally closed contact of a relay 10 can be used as a second operating switching device 11 (FIG. 14, FIG. 17, FIG. 20 and FIG. 33). An adjustable resistor R, connected in series with coil of a relay 10 (FIG. 15), permits to use coil of relay as a sensor of voltage. For example, a relay, for electric circuits of 5 V, can be used as a relay with an adjustable triggering voltage: from rated voltage $U_{RAT}$ to 15 V by using an adjustable resistance of 500 ohm (FIG. 15). When energy storing device is charged to desirable level, contact 11 (second operating switching device 11) of said relay is off.

As a control system 10, with adjustable triggering voltage, can be used a control system similar to control systems, described in U.S. Pat. No. 6,320,281 of the applicant, for example, presented in FIG. 20 of said patent.

Figure 16:
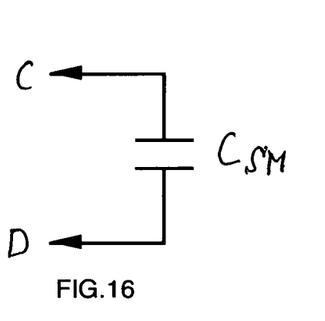
FIG. 16 illustrates that a smoothing capacitor $C_{SM}$ can be connected to the terminals C and D of said load 6.
Figure 17:
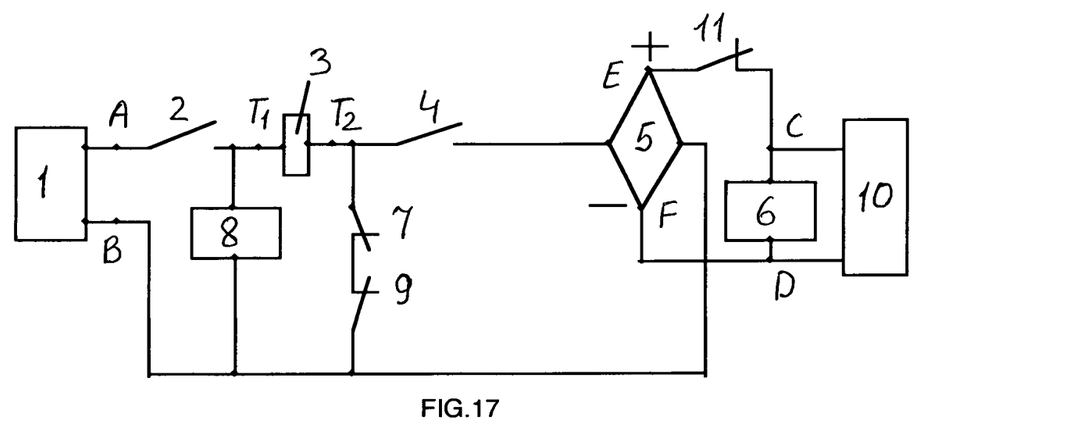

FIG. 16 illustrates a smoothing capacitor $C_{SM}$ (against external disturbances) which can be connected to the terminals C and D of said load 6.

Figure 20:
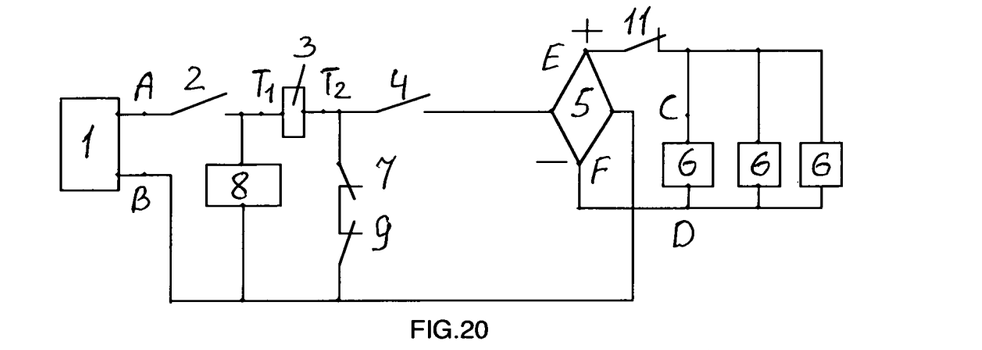

FIG. 20 illustrates technical solution in which a load is formed by three loads 6, for example, by three energy storing devices. This is a technical solution for (simultaneous) power transmission to three energy storing devices.

Figures 21, 22:
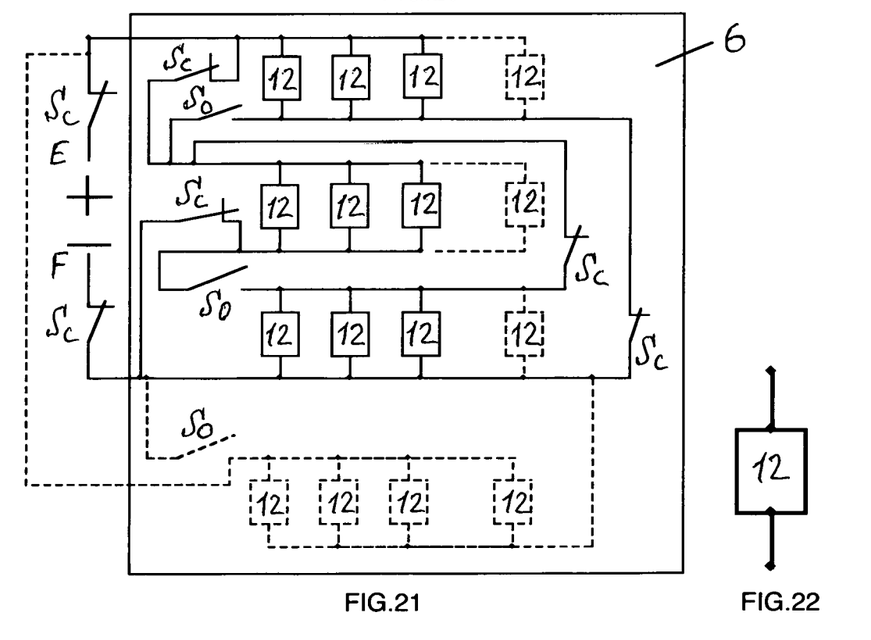
FIG. 21 illustrate a realization with an energy storing device 6 which is formed by many parts, having connected in parallel units 12. Switching devices $S_C$ and $S_O$ allow charging separately each part of parallel connected units 12, and connecting (after charging them) in series said parts.
FIG. 22 illustrates a unit 12 of an energy storing device, which can be, for example, a unit of Lithium-ion battery (with any capacity) or a unit of super-capacitor (with any capacitance).

FIG. 22 illustrate an energy storing unit 12 with a cell.

FIG. 21 illustrates technical solution for (simultaneous) power transmission to N energy storing devices, with energy storing units 12 (which can be batteries or super-capacitors), when switching devices Sc are switched on. After charging, switching devices Sc are switched off. Then N energy storing devices can be connected in series by switching on switching devices So.

Figure 23:
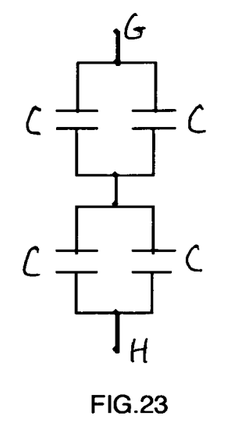
FIG. 23, FIG. 24, FIG. 26 with FIG. 25 illustrate three realizations with 4 capacitors C and the difference between electric discharge time constant for said realizations.
Figure 24:
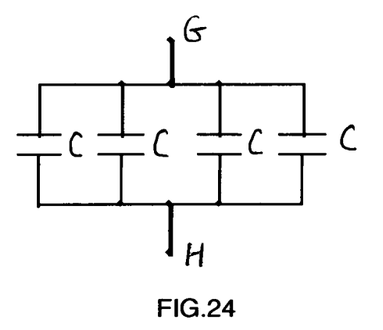
Figure 25:
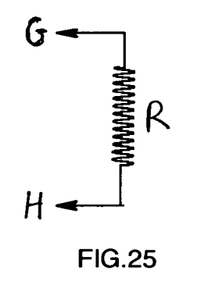
Figure 26:
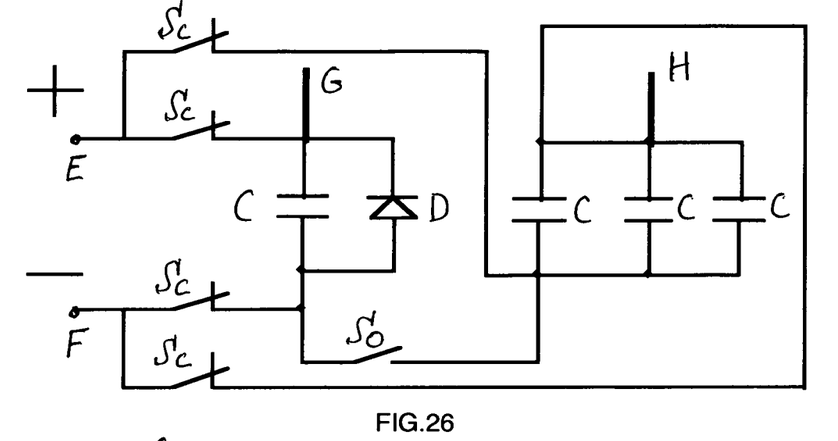

FIG. 23, FIG. 24, FIG. 26 with FIG. 25 explain the difference between time of discharging: for (known) series connection (FIG. 23) of capacitors C (or super-capacitors); for (known) parallel connection (FIG. 24) of capacitors C (or super-capacitors); for hybrid (unknown in the art) connection (FIG. 26) of capacitors (or super-capacitors) with equally charged capacitors (or super-capacitors) C. Total stored energy for each of three realizations (FIG. 23, FIG. 24, FIG. 26) are the same. Said realizations can be discharged by a resistor R connected to output terminal G and H (FIG. 23, FIG. 24, FIG. 26 with FIG. 25), but time of discharging $\Delta T_{DIS}$ will be different:

$$\Delta T_{DISSER} < \Delta T_{DISHYB} < \Delta T_{DISPAR}, \quad (15)$$

where: $\Delta T_{DISSER}$ is the duration of discharging for series connection (FIG. 23); $\Delta T_{DISPAR}$ is the duration of discharging for parallel connection (FIG. 24); $\Delta T_{DISHYB}$ is the duration of discharging for hybrid connection (FIG. 26).

FIG. 26 illustrates also power transmission to a hybrid load (switching devices Sc is switched on). After charging switching devices Sc is switched off and switching device So is switched on and voltage on the terminals G and H (FIG. 26) is equal to voltage on the terminals of parallel connection (FIG. 23). Diode D provides full discharging of the hybrid load (FIG. 26).

Figure 27:
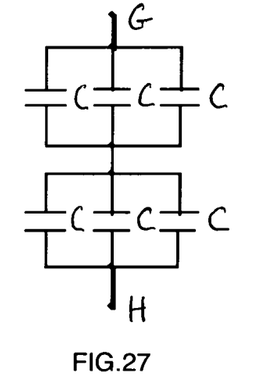
FIG. 27, FIG. 28, FIG. 29, FIG. 30 with FIG. 25 illustrate four realizations with 6 capacitors C and the difference between electric discharge time constant for said realizations.
Figure 28:
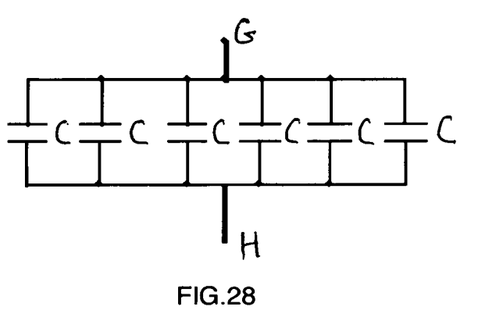
Figure 29:
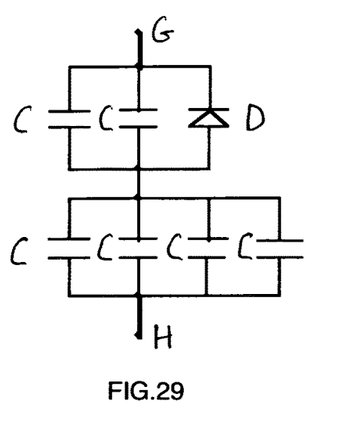
Figure 30:
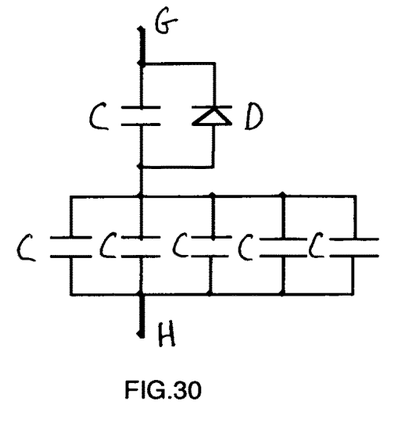

FIG. 27, FIG. 28, FIG. 29, FIG. 30 with FIG. 25 explain the difference between time of discharging: for (known) series connection (FIG. 27) of capacitors C (or super-capacitors); for (known) parallel connection (FIG. 28) of capacitors C (or super-capacitors); for hybrid (unknown in the art) connections (FIG. 29 and FIG. 30) of capacitors (or super-capacitors) with equally charged capacitors (or super-capacitors) C. Total stored energy for each of four realizations (FIG. 27, FIG. 28, FIG. 29 and FIG. 30) are the same. Said realizations can be discharged by a resistor R connected to output terminal G and H (FIG. 27, FIG. 28, FIG. 29, FIG. 30 with FIG. 25), but time of discharging $\Delta T_{DIS}$ will be different:

$$\Delta T_{DISSER} < \Delta T_{DISHYB1} < \Delta T_{DISPAR}, \quad (16)$$

$$\Delta T_{DISHYB1} < \Delta T_{DISHYB2} \quad (17)$$

where: $\Delta T_{DISSER}$ is the duration of discharging for series connection (FIG. 27); $\Delta T_{DISPAR}$ is the duration of discharging for parallel connection (FIG. 28); $\Delta T_{DISHYB1}$ is the duration of discharging for first hybrid connection (FIG. 29); $\Delta T_{DISHYB2}$ is the duration of discharging for second hybrid connection (FIG. 30). Diodes D provide full discharging of the first (FIG. 29) hybrid energy storing device and the second (FIG. 30) hybrid energy storing device.

Power transmission to the hybrid loads for said realizations (FIG. 29 and FIG. 30) is similar to power transmission to the hybrid load 6 (FIG. 31) described below.

Figure 31:
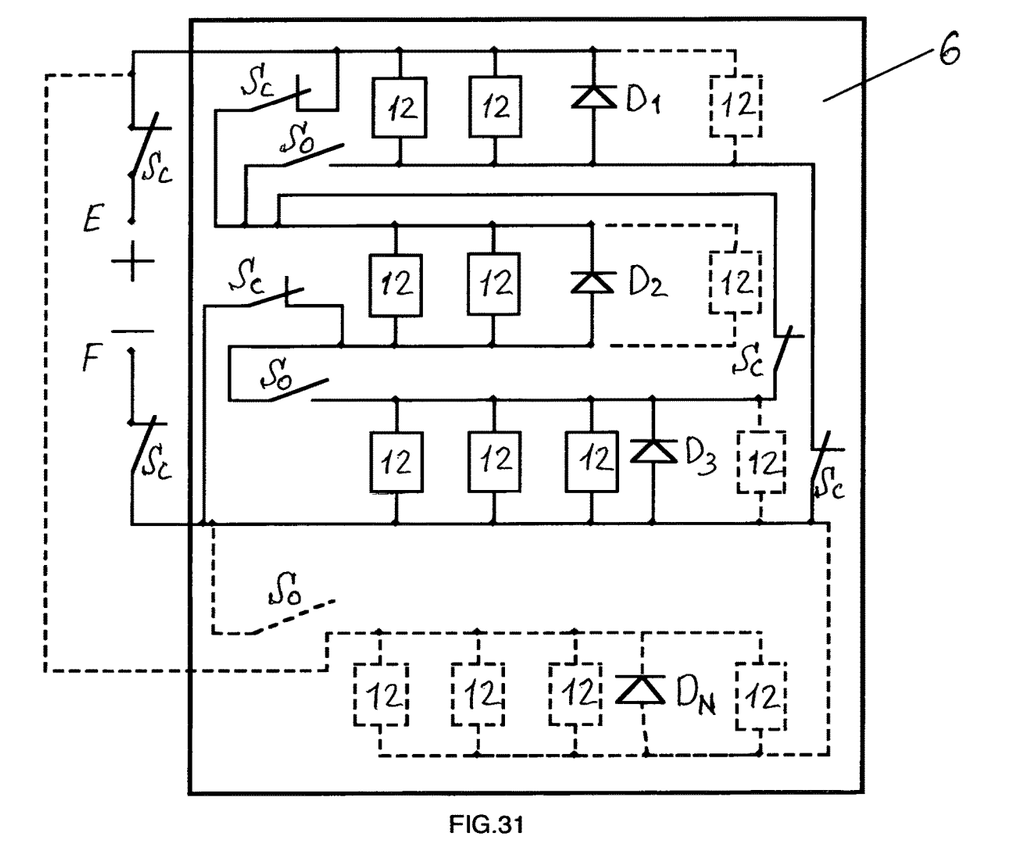
FIG. 31 illustrate a realization with an energy storing device 6 which is formed by many parts, having different number connected in parallel units 12 (in each of said parts), with unidirectional conductive devices $D_1, D_2, D_3 \ldots D_N$ connected in parallel with said units 12 of each of said parts and installed against current of charging of said units. Switching devices $S_C$ and $S_O$ allow charging separately each part of parallel connected units 12, and connecting (after charging them) in series said parts.

FIG. 31 illustrates technical solution for (simultaneous) power transmission to a load with N parts, having different number connected in parallel energy storing units 12 (which can be batteries or super-capacitors) and having no less than one unidirectional conductive device ($D_1, D_2, D_3 \ldots D_N$) connected in parallel with no less than one of energy storing units 12 of each of said parts N and installed against current of charging of said units 12. FIG. 31 also illustrates power transmission to hybrid load when switching device Sc are switched on. After charging switching devices Sc are switched off and switching device So are switched on, and N parts are connected in series. Unidirectional conductive devices (diodes) $D_1, D_2, D_3 \ldots$ and $D_N$, which are installed against current of charging of said units 12 (FIG. 22), permit fully discharging (connected in series) all energy storing units 12.

The time of discharging $\Delta T_{DIS}$ can be changed by changing number connected in parallel energy storing units 12.

Figure 32:
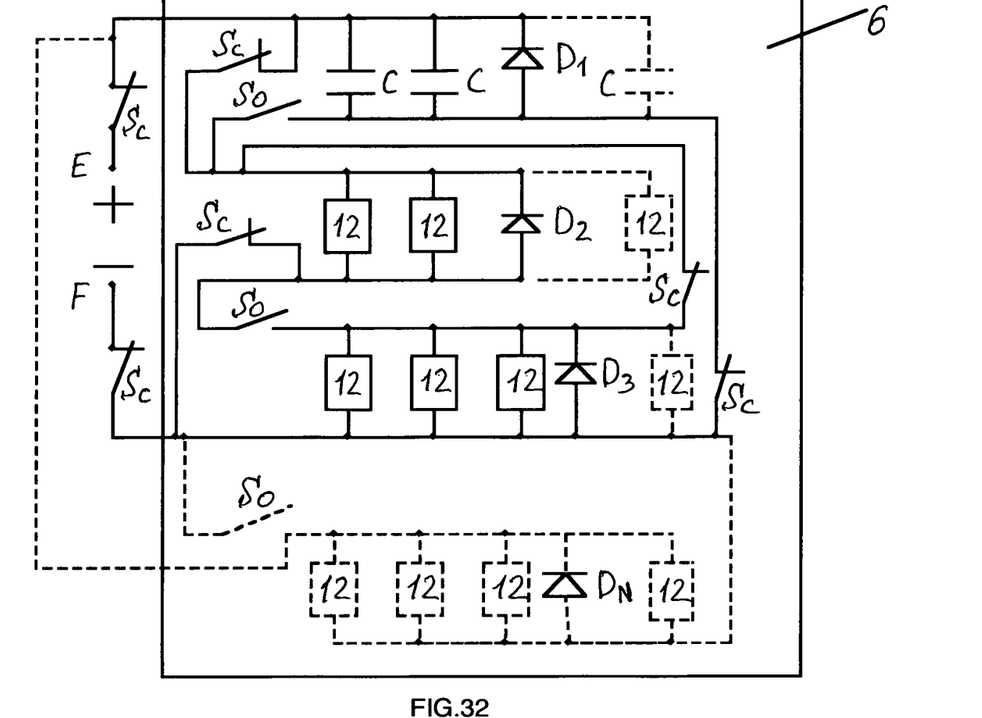
FIG. 32 illustrate a realization with an energy storing device 6 which is formed by many parts, having different number connected in parallel units 12 (in each of said parts) and super-capacitors C with unidirectional conductive devices $D_1, D_2, D_3 \ldots D_N$ connected in parallel (in each of said parts) with said units 12 and super-capacitors C and installed against current of charging of said units and super-capacitors C. Switching devices $S_C$ and $S_O$ allow charging separately each part of parallel connected units 12 and super-capacitors C, and connecting (after charging them) in series said parts.
Figure 33:
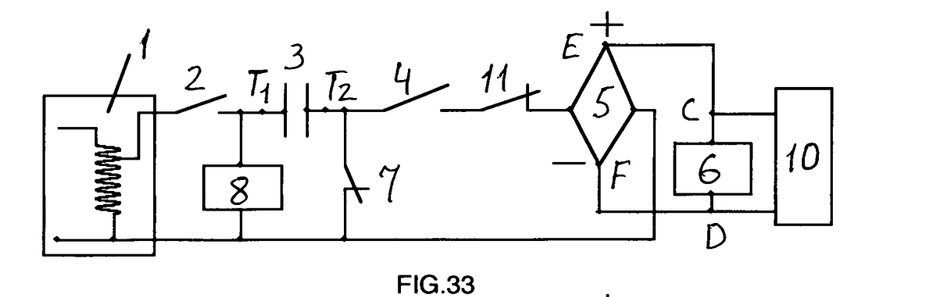

FIG. 32 illustrates technical solution for (simultaneous) power transmission to a load with N parts having: different number connected in parallel energy storing units 12 (which can be batteries and super-capacitors C); no less than one unidirectional conductive device ($D_1, D_2, D_3 \ldots D_N$) connected in parallel with no less than one of energy storing units 12 or super-capacitors C of each of said parts N and installed against current of charging of said units 12 or super-capacitors C. FIG. 32 also illustrates power transmission to hybrid load (with units of batteries 12 and super-capacitors C) when switching device Sc are switched on. After charging: switching devices Sc are switched off and switching device So are switched on; N parts are connected in series. Unidirectional conductive devices (diodes) $D_1, D_2, D_3 \ldots D_N$, which are installed against current of charging of said units 12 (FIG. 22) or super-capacitors C, permit fully discharging all energy storing units 12 and super-capacitors C. Production accuracies of energy storing units 12 and super capacitors C cannot affect a full discharge ["thanks" to the mentioned diodes (FIG. 31, FIG. 32, FIG. 26, FIG. 29 and FIG. 30)]. The time of discharging $\Delta T_{DIS}$ can be changed by changing number of connected in parallel energy, storing units 12 and super-capacitors C (FIG. 31 and FIG. 32).

The present method provides any necessary power transmission to a battery. For example, a capacitor with capacitance $100 \times 10^{-6}$ F (with rated voltage 450 V) provides: approximately 4.07 A, if chosen voltage source of AC is voltage source of 120 V (60 Hz); approximately 8.15 A, if chosen voltage source of AC is voltage source of 240 V (60 Hz); approximately 6.22 A, if chosen voltage source of AC is voltage source of 220 V (50 Hz). A capacitor devices 3 (FIG. 18 and FIG. 19), with 10 capacitors, provides power transmission to an energy storing device with different rate (N=1, or 2, or 3, or 4, or 5, or 6, or 7, or 8, or 9, or 10): N×4.07 A, and with maximum rate 40.7 A, if chosen voltage source of AC is voltage source of 120 V (60 Hz);

N×8.15 A, and with maximum rate 81.5 A, if chosen voltage source of AC is voltage source of 240 V (60 Hz);
N×6.22 A, and with maximum rate 62.2 A, if chosen voltage source of AC is voltage source of 220 V (50 Hz).

For said cases, the rate in the end of charging of a car battery are (approximately) following:
N×3.74 A, and with maximum rate 37.4 A, if chosen voltage source of AC is voltage source of 120 V (60 Hz);
N×7.81 A, and with maximum rate 78.1 A, if chosen voltage source of AC is voltage source of 240 V (60 Hz);
N×5.94 A, and with maximum rate 59.4 A, if chosen voltage source of AC is voltage source of 220 V (50 Hz).

Figure 6:
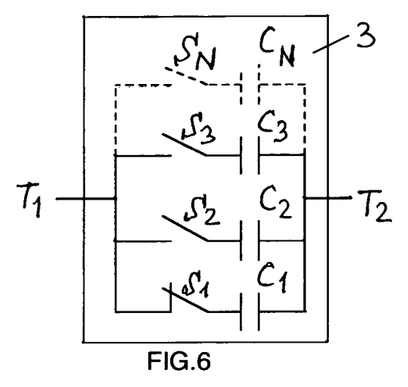
FIG. 6, FIG. 7, FIG. 18 and FIG. 19 illustrate capacitor devices 3, with first $T_1$ and second $T_2$ output terminals, in which $C_1, C_2, C_3 \ldots C_N$ are capacitors, $S_1, S_2, S_3 \ldots S_N$ are switching devices.
Figure 7:
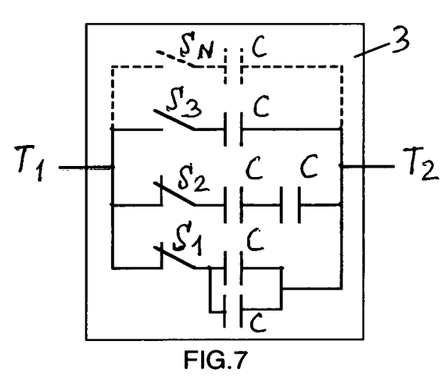
Figure 8:
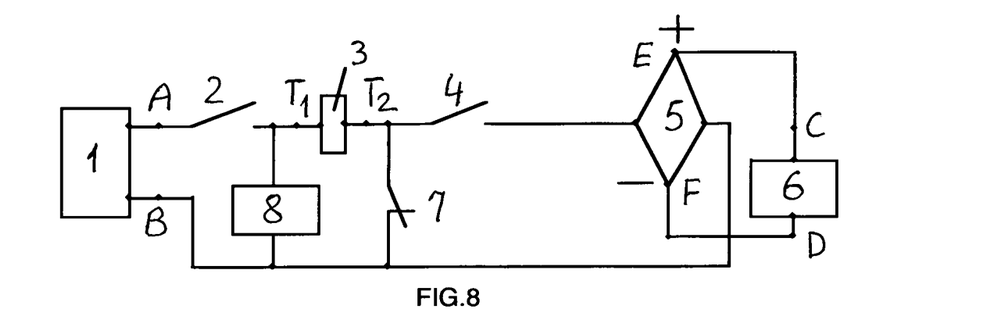
Figure 18:
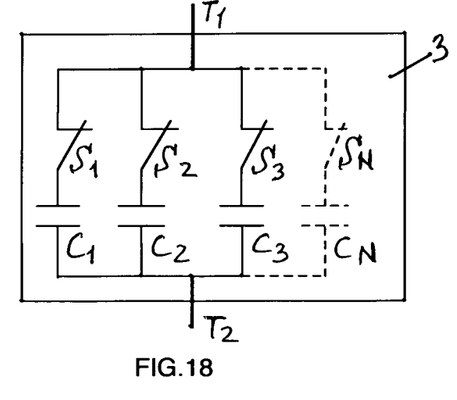
Figure 19:
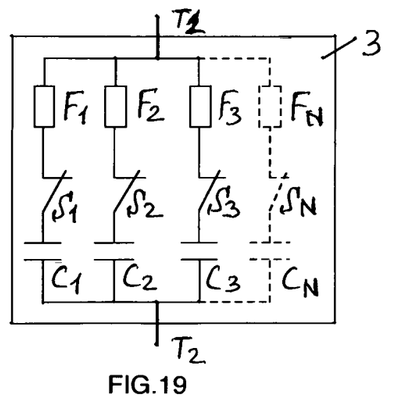

The present method considerably decreases level of inrush current because: a series connected capacitor 3 (FIG. 6) is a suppressor; capacitors $C_1$, $C_2$, $C_3$ . . . $C_N$ can be connected one by one to first $T_1$ and second $T_2$ output terminals of a capacitor devices 3 (FIG. 6, FIG. 18 and FIG. 19). In case of a short circuit between terminals (C and D) of a load, current $I_{SHC}$ will be limited (the equations: 4; 12 above). Current $I_{SHC}$ is usual current because it cannot evoke harmful effects on the technical solutions described above. In case of breakdown of one of said capacitors, power transmission to a load cannot be interrupted (FIG. 19). Therefore, the reliability of power transmission to a load is very high.

Further modifications of the invention herein disclosed will occur to persons skilled in the art and all such modifications are deemed to be within the spirit and scope of the invention as defined by the appended claims.

What is claimed is:

1. A method of controlling power transmission to a load comprising the steps of:
    choosing a voltage source of alternating current with desirable amplitude;
    choosing capacitors with capacitances permitting to obtain desirable values of said power transmission from said voltage source of alternating current to a said load;
    forming a capacitor device with said capacitors and with first and second output terminals;
    connecting said, second output terminal of said capacitor device in series with said load through at least an operating switching device in off state;
    connecting said in series circuit to said voltage source through said first output terminal of said capacitor device;
    connecting said capacitor device in parallel with said voltage source through said first and second output terminals and at least an additional switching device in on state or connecting said capacitor device in parallel with said voltage source through said first and second output terminals and a first and a second additional switching devices in on state;
    switching on said voltage source, then, after a delay time, switching on said operating switching device, then switching off said additional switching device or switching on said voltage source, then, after said delay time, switching on said operating switching device, then switching off said second additional switching device;
    controlling said power transmission to said load by switching on and switching off said additional switching device or controlling said power transmission to said load by switching on and switching off said second additional switching device.

2. The method of controlling said power transmission to a load as claimed in claim 1 further comprising the steps of varying a ratio of on-to-off time of said additional switching device or varying said ratio of on-to-off time of said second additional switching device.

3. The method of controlling said power transmission to a load as claimed in claim 1 further comprising the steps of switching on said additional switching device before switching off said operating switching device or switching on said second additional switching device before switching off said operating switching device.

4. The method of controlling said power transmission to a load as claimed in claim 1 in which each of said capacitors of said capacitor device is connected to said first and second output terminals through a switching device.

5. The method of controlling said power transmission to a load as claimed in claim 4 further comprising the steps of connecting at least one of said capacitors to said output terminals or disconnecting at least one of said capacitors from said output terminals.

6. The method of controlling said power transmission to a load as claimed in claim 1 in which said load is an inductive load.

7. The method of controlling said, power transmission to a load as claimed in claim 1 in which said voltage source includes step-up transformer.

8. The method of controlling said power transmission to a load as claimed in claim 1 in which said step of switching on of said additional switching device or said step of switching on of said second additional switching device is controlled by zero crossing voltage control device connected to said voltage source through a bridge rectifier.

9. A method of controlling power transmission to a load comprising the steps of:
    choosing a voltage source of alternating current with desirable amplitude;
    choosing capacitors with capacitances permitting to obtain desirable values of said power transmission from said voltage source of alternating current to said load;
    forming a capacitor device with said capacitors and with first and second output terminals;
    connecting said second output terminal of said capacitor device in series with said load through at least an operating switching device in off state and a bridge rectifier, or connecting said second output terminal of said capacitor device in series with said load through said bridge rectifier and said at least an operating switching device in off state;
    connecting said in series circuit to said voltage source through said first output terminal of said capacitors device;
    connecting said capacitor device in parallel with said voltage source through said first and second output terminals and at least an additional switching device in on state or connecting said capacitor device in parallel with said voltage source through said first and second output terminals and a first and a second additional switching devices in on state;
    switching on said voltage source, then, after a delay time, switching on said operating switching device, then switching off said additional switching device or switching on said voltage source, then, after said delay time, switching on said operating switching device, then switching off said second additional switching device;
    controlling said power transmission to said load by switching on and switching off said additional switching device or controlling said power transmission to said load by switching on and switching off said second additional switching device.

10. The method of controlling said power transmission to a load as claimed in claim 9 further comprising the steps of varying a ratio of on-to-off time of said additional switching device or varying said ratio of on-to-off time of said second additional switching device.

11. The method of controlling said power transmission to a load as claimed in claim 9 further comprising the steps of switching on said additional switching device before switching off said operating switching device or switching on said second additional switching device before switching off said operating switching device.

12. The method of controlling said power transmission to a load as claimed in claim 9 in which each of said capacitors of said capacitor device is connected to said first and second output terminals through a switching device.

13. The method of controlling said power transmission to a load as claimed in claim 12 further comprising the steps of connecting at least one of said capacitors to said output terminals or disconnecting at least one of said capacitors from said output terminals.

14. The method of controlling said power transmission to a load as claimed in claim 9 further comprising the steps of connecting terminals of said load through a smoothing capacitor.

15. The method of controlling said power transmission to a load as claimed in claim 9 further comprising the steps of measuring at least a parameter of said load or a parameter near to said load and using it for triggering switching on and switching off of said additional switching device or for triggering switching on and switching off of said second additional switching device.

16. The method of controlling said power transmission to a load as claimed in claim 9 in which said load is an energy storing device.

17. The method of controlling said power transmission to a load as claimed in claim 16 further comprising the steps of controlling voltage of said energy storing device and switching off said operating switching device when said energy storing device is charged to desirable level.

18. The method of controlling said power transmission to a load as claimed in claim 17 further comprising the steps of switching on said additional switching device before switching off said operating switching device or switching on said second additional switching device before switching off said operating switching device.

19. The method of controlling said power transmission to a load as claimed in claim 9 in which said load is formed by two or more parts or by two or more loads.

20. The method of controlling said power transmission to a load as claimed in claim 19 in which said loads are the parts of an energy storing device.

21. The method of controlling said power transmission to a load as claimed in claim 20 in which said energy storing device is formed by no less than two parts, having different number connected in parallel to an energy storing units, and having no less than one unidirectional conductive device connected in parallel with no less than one of said energy storing units of each of said parts and installed against current of charging of said energy storing units.

22. The method of controlling said power transmission to a load as claimed in claim 9 in which said voltage source includes a voltage transformer.

23. The method of controlling said power transmission to a load as claimed in claim 9 in which said voltage source includes step-up transformer.

24. The method of controlling said power transmission to a load as claimed in claim 9 in which said step of switching on of said additional switching device or said step of switching on of said second additional switching device is controlled by zero crossing voltage control device connected to said voltage source through said bridge rectifier.

25. The method of controlling said power transmission to a load as claimed in claim 9 in which said load is control circuits of a switching device.

* * * * *